United States Patent [19]

Dull

[11] Patent Number: 4,889,012
[45] Date of Patent: Dec. 26, 1989

[54] DAMPING ASSEMBLY FOR A TORQUE CONVERTER CLUTCH

[75] Inventor: Dennis C. Dull, Arcanum, Ohio

[73] Assignee: General Motors Corporation, Detroit, Mich.

[21] Appl. No.: 254,065

[22] Filed: Oct. 6, 1988

Related U.S. Application Data

[63] Continuation-in-part of Ser. No. 93,198, Sep. 4, 1987, abandoned.

[51] Int. Cl.⁴ .......................... F16H 47/08; F16H 3/44
[52] U.S. Cl. ......................................... 74/730; 74/688; 74/732; 192/3.3; 192/3.31; 192/3.28
[58] Field of Search ................. 74/732, 731, 730, 688, 74/765; 192/3.3, 3.25, 3.31, 3.28

[56] References Cited

U.S. PATENT DOCUMENTS

| | | | |
|---|---|---|---|
| 2,106,423 | 1/1938 | De Lavaud | 192/3.31 |
| 2,903,910 | 9/1959 | Carnegie | 74/732 |
| 2,956,449 | 10/1960 | Foerster | 74/730 |
| 2,995,956 | 8/1961 | Moore | 74/732 |
| 2,999,400 | 9/1961 | Kelley | 74/688 |
| 3,025,725 | 3/1962 | Roche | 74/732 |
| 3,041,892 | 7/1962 | Schjolin | 74/732 |
| 3,425,295 | 2/1969 | Galaniuk | 74/688 |
| 3,528,321 | 9/1970 | Harmon et al. | 74/688 |
| 4,117,745 | 10/1978 | Yokoyama et al. | 74/688 |
| 4,291,790 | 9/1981 | Staub, Jr. | 192/3.28 |
| 4,382,393 | 5/1983 | Bowen | 74/688 |
| 4,398,436 | 8/1983 | Fisher | 74/688 |
| 4,513,634 | 4/1985 | Ohtsuka | 74/688 |
| 4,545,264 | 10/1985 | Hau et al. | 74/730 |
| 4,638,686 | 1/1987 | Lemieux et al. | 74/688 |

Primary Examiner—Leslie A. Braum
Assistant Examiner—William Gehris
Attorney, Agent, or Firm—Donald F. Scherer

[57] ABSTRACT

A torque converter turbine, clutch and output shaft are interconnected by a planetary gear arrangement. The gear arrangement combines the output of the turbine and clutch, when engaged, at the torque converter output shaft. The turbine provides a reaction for the gear set so that transient torque spikes, or torsional vibrations, are effectively dampened by permitting the turbine to decrease in speed, and thereby absorb the torque spike energy. A clutch, between the turbine and output shaft, prevents the turbine from overrunning the output shaft when the torque converter clutch is disengaged. The clutch transmits torque from the turbine to the output shaft when the torque converter clutch is disengaged.

3 Claims, 2 Drawing Sheets

DAMPING ASSEMBLY FOR A TORQUE CONVERTER CLUTCH

This is a Continuation-in-Part application of U.S. Ser. No. 93,198, filed Sept. 4, 1987 now abandoned.

BACKGROUND OF THE INVENTION

This invention relates to torsional dampers and more particularly to torsional dampers for torque converter clutches.

Clutch dampers which reduce torsional vibrations brought about by engine torque spikes are well known. Dampers for torque converter clutches have generally been spring-type dampers. In these dampers, springs are utilized to permit relative motion between the input and output members of the clutch. The energy stored in the springs is either returned to the output when the torque spike decreases or partially given up to a friction damper in parallel with the springs.

A viscous clutch in series with a friction clutch has also been used. The viscous clutch does not pass the torque spikes or torsional vibrations, similar to a fluid coupling, so that the operator does not feel the torsional vibrations downstream of the torque converter when the clutch is engaged.

Another device for reducing the input torsional vibrations to a transmission is a slipping clutch. The slipping clutch is utilized in the same space as a fully engaged torque converter clutch. The slipping clutch is controlled by apply and release pressures so that complete engagement is not reached. Because of the slipping interface between the engine output and the clutch input, the torsional vibrations are not transmitted to the clutch member.

SUMMARY OF THE INVENTION

The present invention seeks to provide dampening of the torsional vibrations at the torque converter clutch input by permitting the torque converter to absorb the vibrations. With this arrangement the clutch can be fully engaged so that no slippage at the clutch interface will occur. The torque converter turbine and the clutch are connected to separate members of a planetary gear arrangement which also has a member connected with a torque converter output shaft. The torque spikes or torsional vibrations are effectively absorbed by the torque converter.

The planetary gear arrangement has two input members which are connected to the clutch and the turbine. These input members combine the power delivered by the engine and direct it through the planetary gear arrangement to the torque converter output shaft. When a torque spike is present at the clutch, the turbine effectively becomes a rotating reaction and will reduce in speed to absorb the instantaneous energy of the torque spike thereby preventing the torque spike from reaching the output shaft. Thus, no disturbance will be transmitted downstream of the torque converter clutch. The planetary gear arrangement can be sized to control the speed differential, during steady state, between the clutch and the turbine. Thus, the power transmitted is split between mechanical and hydraulic power paths.

The torque converter turbine and the planetary output are also coupled by a one-way clutch which prevents the turbine from overrunning the output shaft. When the clutch is disengaged, all the power is transmitted by the torque converter, through the one-way clutch to the output shaft. Generally the torque converter clutch is disengaged when the transmission is operating in the low forward ratio or in the reverse ratio.

It is an object of this invention to provide an improved turbine damped torque converter and clutch assembly having a planetary gear set disposed between the turbine, the clutch and the output shaft whereby torque spikes imposed on the clutch are dampened by the planetary gear set and the turbine.

It is another object of this invention to provide an improved turbine damped torque converter and clutch assembly having a planetary gear set disposed between the turbine, the clutch and the output shaft whereby torque spikes imposed on the clutch are dampened by the planetary gear set and the turbine and a friction clutch is arranged to establish a direct drive connection between the torque converter turbine and the output shaft when the torque converter clutch is disengaged.

It is yet another object of this invention to provide an improved turbine damped torque converter and clutch assembly wherein a planetary gear arrangement combines input power from a selectively engageable clutch and a torque converter turbine for delivery to an output member and also wherein a one-way clutch is drive connected between the turbine and the output member for delivering power to the output member when the clutch is disengaged and the turbine is attempting to rotate faster than the output member.

It is a further object of this invention to provide an improved torque converter and clutch assembly wherein a planetary gear arrangement is disposed between the clutch, the torque converter turbine and the output member such that the turbine provides a reaction member for the engine torsional vibrations imposed on the clutch whereby turbine dampening occurs and the torsional vibrations are not transmitted downstream of the clutch to the output member.

It is a still further object of this invention to provide an improved torque converter or clutch assembly wherein a planetary gear arrangement interconnects the clutch, torque converter turbine and torque converter output shaft such that the turbine is effective as a reaction element to absorb the energy of engine torsional vibrations imposed on the clutch and also wherein both the clutch and turbine deliver power to the output shaft and further wherein the planetary gear arrangement permits the turbine to rotate at a speed less than the clutch when both members are transmitting power to the output shaft.

It is a further object of this invention to provide an improved torque converter and torque converter clutch assembly wherein a planetary gearing arrangement interconnects the torque converter clutch, the torque converter turbine and the torque converter output shaft to permit speed differentials therebetween when a torque converter clutch is engaged with the torque converter impeller, and also wherein a friction clutch assembly is engageable upon release of the torque converter clutch to connect the torque converter turbine for unitary rotation with the torque converter output shaft.

These and other objects and advantages will be more apparent from the following description and drawings.

DESCRIPTION OF EXEMPLARY EMBODIMENTS OF THE INVENTION

Figure 1:
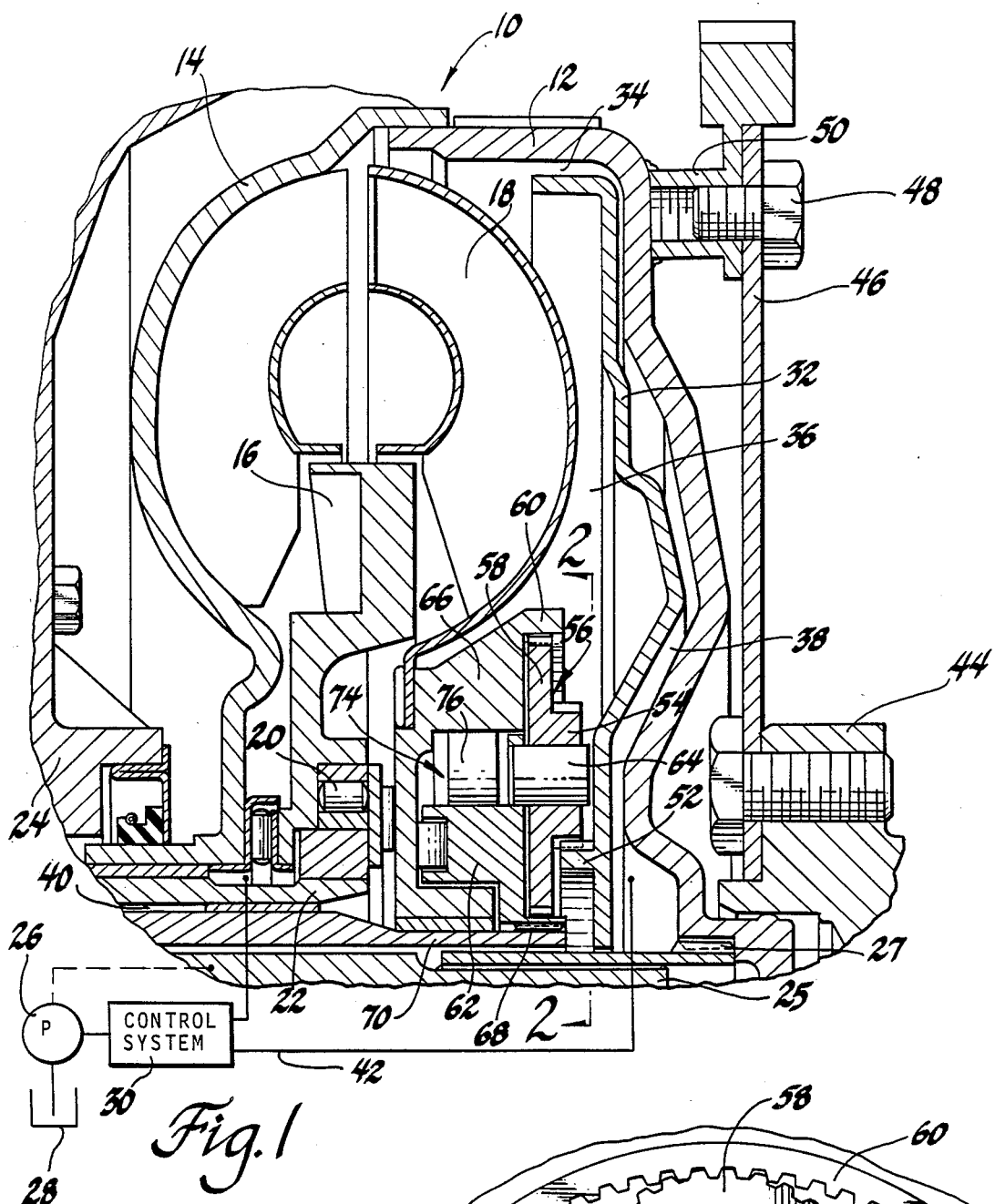
FIG. 1 is a cross-sectional elevational view of a torque converter and clutch assembly incorporating the present invention and a schematic representation of a control system.

Referring to the drawings wherein like characters represent the same or corresponding parts throughout the views, there is seen in FIG. 1 a torque converter and clutch assembly generally designated 10 which includes an input shell 12 welded to an impeller 14. The torque converter impeller is in toroidal flow relation with a stator 16 and a turbine 18. The stator 16 is drivingly connected to a stator one-way brake 20 to a stator shaft 22 which is connected to a stationary portion of the transmission such as housing 24. The input shell 12 is drivingly connected to a shaft 25 by a spline connection 27. The shaft 25 is drivingly connected to a conventional hydraulic pump 26. Since the input shell 12 is continuously driven by the engine, the pump 26 will be continuously driven by the engine. The pump 26 is effective to draw fluid from a reservoir 28 and deliver the fluid to a control system 30.

A torque converter clutch 32 is disposed in the envelope or space 34 formed between the turbine 18 and the input shell 12. The turbine and clutch 32 cooperate to form an apply chamber 36 while the input shell 12 and clutch 32 cooperate to form a release chamber 38. The control 30 is effective to regulate fluid pressures and to distribute fluid under pressure to the apply chamber 36 and to the release chamber 38 depending upon the transmission operating condition and various vehicle parameters. This type of control is well known and has been utilized in commercial vehicles for a number of years. The control can either be a reverse flow control wherein it is desirable to engage the torque converter clutch, a passage 40 is pressurized. The fluid pressure and passage 40 passes through the torque converter and into the apply chamber 36 to enforce engagement of the clutch 32. When it is desirable to have the clutch disengaged, a passage 42 is pressurized such that fluid under pressure is directed to the release chamber 38. Fluid in the release chamber 38 passes through the friction interface between the clutch 32 and the input shell 12 and into the torque converter 10. The fluid is utilized by the torque converter 10 to transmit power from the impeller 14 to the turbine 18 in a well known manner. The basic construction of these elements and torque converters in general, is well known. It is not considered that a more complete description of these elements is necessary at this point.

The input shell 12 is driven from an engine crankshaft 44 which is a component of an internal combustion engine not shown. The drive connection between the engine crankshaft 44 and input shell 12 is by way of a conventional flex plate 46 and a plurality of fasteners 48 which secure the lugs 50 of input shell 12 to the flex plate 46. This input drive mechanism is a well known structure and has been utilized in many previous transmissions.

Figure 2:
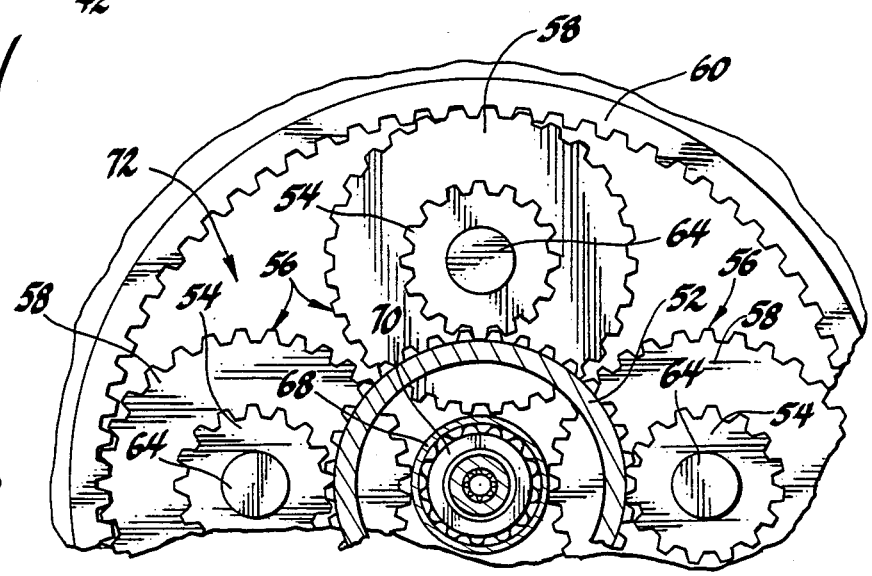
FIG. 2 is a view taken along line 2—2 of FIG. 1.

The clutch 32 has formed thereon a sun gear 52 near its inner periphery. The sun gear 52 meshes with a pinion gear 54 which is a portion of a stepped pinion gear 56. A larger diameter pinion gear 58, also a portion of the pinion gear 56, meshes with a ring gear 60. The pinion gear 56 is rotatably mounted on a carrier 62 by a plurality of pinion pins 64. The ring gear 60 is secured to or otherwise formed integral with a hub 66 which is secured to the inner diameter of the turbine 18. The carrier 62 is drivingly connected, through a spline connection at 68, to a torque converter output shaft 70 which is drivingly connected to a conventional transmission not shown. The sun gear 52, ring gear 60, planet pinions 56 and carrier 62 cooperate to form a planetary gear arrangement generally designated 72 and best seen in FIG. 2. Whenever the clutch 32 is engaged with the input shell 12, the sun gear 52 will rotate at the speed of the engine. The turbine 18 will attempt to rotate at some speed less than the impeller 14 because of the fluid and power transmission losses, that occur in a torque converter. Since the turbine 18 is drivingly connected with the ring gear 60, the ring gear must travel at the same speed as the turbine. By selecting the diameter ratios between the sun gear 52 and ring gear 60 and pinion gears 54 and 58, the steady state rotary speed of the turbine 18 can be controlled. For example, if the ring gear 60 has a diameter of five (5) units and the pinion 58 has a diameter of two (2) units, a 2% slip speed will occur if the sun gear 52 has a diameter of 2.13 units and the pinion gear 54 has a diameter of 0.87 units. Should it be desirable to have a larger percent slip, for example say 7%, this can be achieved by providing the sun gear 52 with the diameter of 2.1 units while the pinion 54 is given a diameter of 0.9 units. Of course the exact diameters and slip ratio will be determined by the accepted gear design parameters and practice which are controlled limited by the pitch diameter tooth size and other gear dimensions. These are selected to provide a properly sized planetary arrangement which will fit within the envelope given.

Assuming that the torque converter 10 is operating at a steady state condition, that is the vehicle in which this torque converter is utilized is being driven on the road at a steady speed, the speed differential between the clutch 32 and turbine 18 is fixed. If a torsional vibration induced by engine roughness or a transient torque spike should be imposed upon the clutch, the clutch will try to accelerate. If acceleration of the clutch is permitted, the operator of course will feel the torsional vibration. To prevent the torsional vibration from being transmitted to the output shaft 70, the turbine 18 will reduce in speed thus providing a reaction member within the planetary gear arrangement 72. When the turbine 18 reduces in speed, the output shaft 70 will maintain a constant speed. Thus the torsional vibration is wholly absorbed within the torque converter and clutch assembly.

The hub 66 forms an outer race for a one-way clutch generally designated 74, which is comprised of a plurality of rollers 76 and the outer diameter of a portion of the carrier 62. The one-way clutch 74 is designed such that when the turbine attempts to rotate faster than the output shaft 70, the one-way clutch 74 prevents such overrunning. Thus the turbine 18 can directly drive the output shaft 70. This occurs most often when the clutch 32 is disengaged. During vehicle operation with the clutch 32 disengaged, all of the power of the engine crankshaft 44 is directed to the impeller 14. The impeller 14, in a well known manner, directs power to the turbine 18 which in turn delivers power through the one-way clutch 74 to the torque converter output shafts 70 and hence to the transmission.

Figure 3:
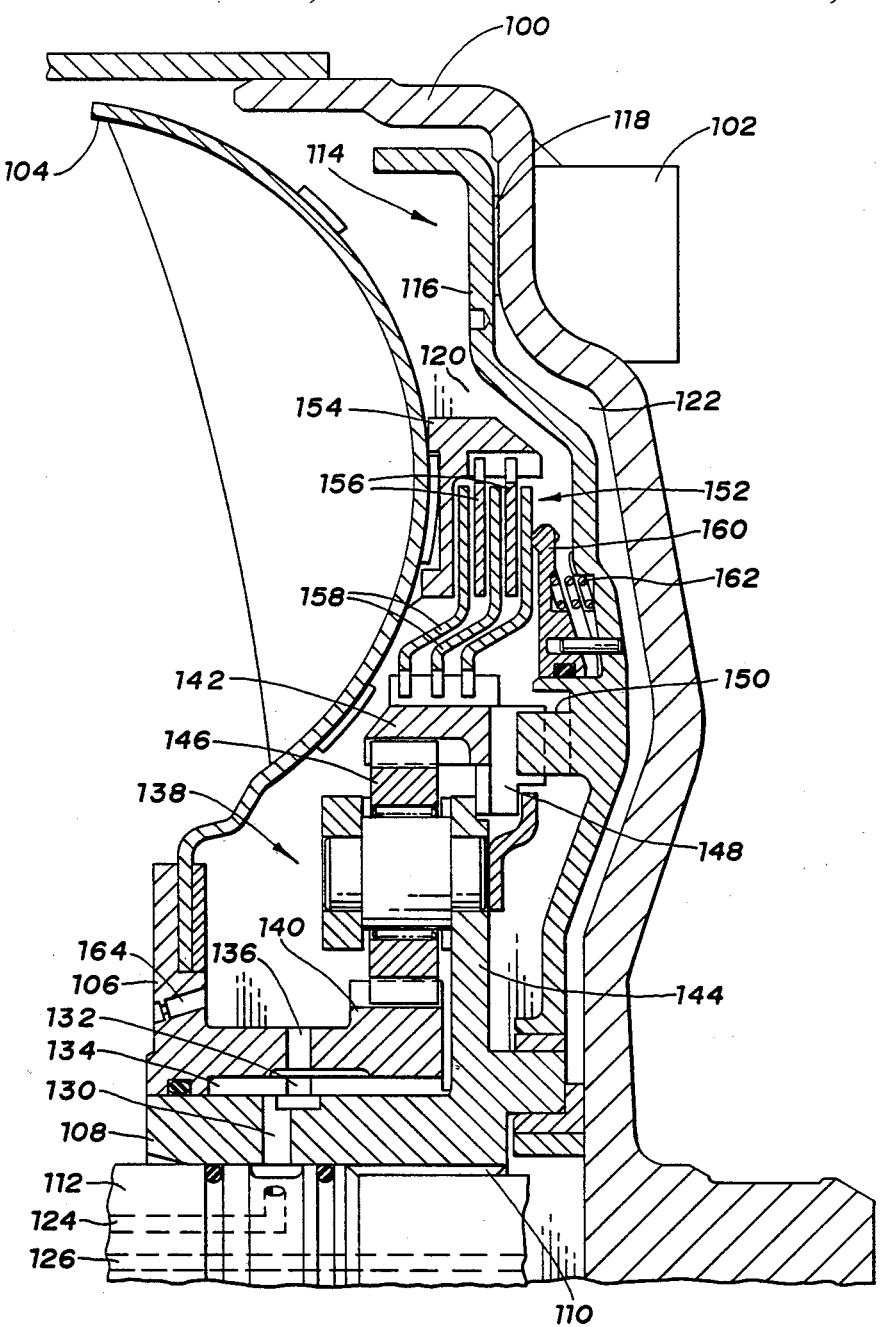
FIG. 3 is a cross sectional elevational view of another embodiment of the invention.

FIG. 3 depicts a partial sectional view of a torque converter and torque converter clutch assembly similar to that shown in FIG. 1. The torque converter includes an input shell 100 which has secured thereto a plurality of drive lugs 102 adapted to be connected to a prime mover, not shown. The input shell 100 is connected to a conventional torque converter impeller, not shown.

The torque converter also includes a turbine member 104 driven in a conventional manner by fluid circulated through the torque converter torus. The turbine 104 includes a hub member 106 which is rotatably supported on an output hub 108. The output hub 108 has a spline portion 110 to which is drivingly connected a torque converter output shaft 112.

Disposed in the space between the input shell 100 and the turbine 104 is a torque converter clutch assembly 114 which includes a selectively engageable clutch plate 116 on which is disposed a friction pad 118. The clutch plate 116 divides the space between the input shell 100 and turbine 104 into an apply chamber 120 and a release chamber 122. The apply chamber 120 is supplied with fluid pressure through a passage 124 formed in the output shaft 112 while the release chamber 122 is supplied with pressure through a passage 126 formed in the output shaft 112.

The fluid pressure in passage 124 passes through a passage 130 formed in the output hub 108, a passage 132 formed in a bushing 134 and a passage 136 formed in the hub 106. Fluid pressure in the apply chamber 120 will cause the torque converter clutch 114 to frictionally engage the input shell 100 thereby providing a unitary rotary drive therebetween. Fluid pressure admitted to passage 126 will cause pressurization of the release chamber 122 which is effective to disconnect the frictional drive connection between the torque converter clutch 114 and the input shell 100.

The fluid pressure delivered to the passages 124 and 126 can be controlled by many of the well known torque converter clutch control assemblies, and it is not considered that a description of such hydraulic mechanisms is warranted since these will be readily known to those skilled in the art.

The apply chamber 120 has disposed therein a planetary gear arrangement 138 which includes a sun gear 140 formed integral with or otherwise secured to the hub 106, a ring gear 142, a carrier member 144 formed integrally with or otherwise secured to the output hub 108 and a plurality of pinion gears 146 rotatably mounted on the carrier 144 in meshing relation with the sun gear 140 and the ring gear 142. The ring gear 142 has a driven tang 148 formed thereon which is engaged by a drive tang 150 formed on the clutch plate 116. Therefore, the ring gear 142 will rotate in unison with the clutch plate 116.

A multiplate friction clutch assembly 152 is also disposed in the apply chamber 120. This friction clutch assembly 152 includes a hub 154 secured to the turbine 104, a plurality of friction discs 156 splined to the hub 154, a plurality of friction discs splined to the ring gear 142 and an apply piston 160 which is slidably mounted on the clutch plate 116. The apply piston 160 is an annular member and has a plurality of lightly loaded springs 162 disposed in abutting relation with the clutch plate 116 to urge the apply piston 160 toward the friction discs 156 and 158. The force in springs 162 is not sufficient to cause engagement of the clutch 152 whenever fluid pressure in the apply chamber is sufficient to engage the torque converter clutch 114 with the input shell 100.

During release of the torque converter clutch 114, that is, when the release chamber 122 is pressurized, the annular apply piston 160 will be forced leftward, as viewed in FIG. 3, to enforce frictional engagement between the friction discs 156 and 158. With the clutch 152 thus engaged, the torque converter turbine 104 is connected directly with both the sun gear 140 and the ring gear 142. Therefore, the planetary gear set 138 will rotate in unison with the turbine 104. Since the output hub 108 rotates with the carrier 144, the output shaft 112 will be driven at the speed of the torque converter turbine 104. Also, at this point, the torque converter clutch 114 is disengaged and therefore the torque converter will be fully operable as the only drive transmitting mechanism between the input shell 100 and the output shaft 112.

When the torque converter clutch 114 is engaged by applying pressure in chamber 120 while releasing pressure in chamber 122, the friction clutch 152 will be disengaged. The ring gear 142 will be driven directly by the input shell 100 and therefore will rotate at engine speed. The torque converter turbine 104 and therefore sun gear 140 will be driven by the hydraulic connection between the impeller, not shown, and the turbine 104 which, as is well-known, will result in a speed ratio of less than 1:1.

With the planetary pinions 146 free to planetate, the carrier 144 and therefore hub 108 and output shaft 112 will rotate at a speed less than the speed of the engine, as represented by the ring gear 142 and greater than the speed of the sun gear, as represented by the speed of turbine 104. The speed ratio for any given system will be dependent upon the number of teeth on the sun gear 140 and the ring gear 142. The determination of the speed ratio within a planetary gear mechanism is well known.

If a transient torque impulse is imposed upon the input shell 100 by the engine with the torque converter clutch 114 engaged, the ring gear 142 will change its rotary speed due to the torque impulse. The change in torque at the ring gear 142 will be compensated for by a change in the torque of the planetary member having the least inertia, which in this instance, will be the turbine 104. Therefore, the sun gear 140 will change rotary speed accordingly, while the speed of the carrier 144 will remain substantially constant or change with such slight significance that the change in speed will be imperceptible to the operator. Thus, the damping of the engine torque impulses is accomplished through the combination of the torque converter assembly and the planetary gear assembly 138.

When the torque converter clutch 114 is engaged, the fluid flow through the torque converter turbine is substantially reduced. Therefore, the cooling flow of the hydraulic fluid is also reduced. To encourage cooling flow which also provides lubrication for various components within the transmission, one or more restricted passages, such as 164, will be formed in the torque converter hub 106. This passage 164 permits fluid flow from the apply chamber 120 to various components within the torque converter and transmission which require lubrication and also establishes a flow path for fluid to be returned to the sump through a cooling mechanism such as a radiator, not shown.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A turbine damped torque converter and clutch comprising: a pressure plate; a torque converter turbine; a torque converter impeller; means including a control chamber for said pressure plate means for controlling the apply and release of said clutch for engaging said clutch with said impeller; a torque converter output shaft; a planetary gear arrangement including an input gear drivingly connected with said pressure plate, a reaction gear drivingly connected with said turbine, an output member drivingly connected with said output shaft and pinion gear means meshing with said input gear and said reaction gear for drivingly interconnecting said turbine and said pressure plate at a drive ratio of said turbine to said pressure plate of less than 1:1; and one-way drive means disposed between said turbine and said output shaft for preventing the turbine from overrunning said output shaft.

2. A turbine damped torque converter and clutch comprising; a pressure plate; a torque converter turbine; a torque converter impeller; means including a control chamber for said pressure plate means for controlling the apply and release of said clutch for engaging said clutch with said impeller; a torque converter output shaft; a planetary gear arrangement including an input gear drivingly connected with said pressure plate, a reaction gear drivingly connected with said turbine, an output member drivingly connected with said output shaft rotatably supporting pinion gear means which mesh with said input gear and said reaction gear for drivingly interconnecting said turbine and said pressure plate at a drive ratio of said turbine to said pressure plate of less than 1:1; and selectively engageable drive establishing clutch means for establishing a direct drive between said torque converter turbine and said torque converter output shaft when said pressure plate means is released by said control chamber.

3. A turbine damped torque converter and clutch comprising; clutch pressure plate; a torque converter turbine; a torque converter impeller; means including a control chamber for said pressure plate means for controlling the apply and release of said clutch for engaging said clutch with said impeller; a torque converter output shaft; a planetary gear arrangement including a first gear drivingly connected with said pressure plate, a second gear drivingly connected with said turbine, pinion gear means meshing with said first and second gears and interconnecting said turbine and said pressure plate at a drive ratio of said turbine to said pressure plate of less than 1:1 and carrier means rotatably supporting said pinion gear means and being drivingly connected with said output shaft; and one-way drive means disposed between said turbine and said output shaft for preventing the turbine from overrunning said output shaft.

* * * * *